United States Patent
Chen

(10) Patent No.: US 10,451,142 B2
(45) Date of Patent: Oct. 22, 2019

(54) OUTER CUP ROTARY AXIAL EDDY CURRENT DAMPER

(71) Applicant: Zhengqing Chen, Changsha (CN)

(72) Inventor: Zhengqing Chen, Changsha (CN)

( * ) Notice: Subject to any disclaimer, the term of this patent is extended or adjusted under 35 U.S.C. 154(b) by 430 days.

(21) Appl. No.: 15/510,458

(22) PCT Filed: Sep. 15, 2014

(86) PCT No.: PCT/CN2014/086502
§ 371 (c)(1),
(2) Date: Mar. 10, 2017

(87) PCT Pub. No.: WO2016/041116
PCT Pub. Date: Mar. 24, 2016

(65) Prior Publication Data
US 2017/0294828 A1    Oct. 12, 2017

(51) Int. Cl.
*F16H 25/20* (2006.01)
*H02K 49/04* (2006.01)
(Continued)

(52) U.S. Cl.
CPC ............ *F16F 15/035* (2013.01); *F16F 6/005* (2013.01); *F16F 2232/06* (2013.01);
(Continued)

(58) Field of Classification Search
CPC ........ H02K 7/06; H02K 49/04; H02K 49/043; H02K 49/046; H02K 16/02; H02K 1/2786;
(Continued)

(56) References Cited

U.S. PATENT DOCUMENTS

| | | | |
|---|---|---|---|
| 6,453,761 B1 * | 9/2002 | Babinski | H02K 7/06 29/898.06 |
| 2008/0072695 A1 * | 3/2008 | Hudson | B64C 13/28 74/89.25 |

(Continued)

FOREIGN PATENT DOCUMENTS

CN    2738466 Y    11/2005
CN    202991993 U    6/2013
(Continued)

OTHER PUBLICATIONS

JP-2000320607-A (English Translation) (Year: 2000).*

*Primary Examiner* — Burton S Mullins
*Assistant Examiner* — Alexander Moraza

(57) ABSTRACT

A large-size axial eddy current damper manufactured by use of screw drive comprises a drive assembly and an eddy current damping generator; the drive assembly comprises a screw drive pair, and a stator and a rotor respectively made of magnetic conductive materials; the screw drive pair comprises a screw rod and a nut sleeved on the screw rod; the screw rod sequentially penetrates through central holes of upper and lower flanges of the stator; the nut is within the stator; the rotor comprises an outer rotor and an inner rotor having the bottom provided with a lower connecting flange; one or more eddy current damping generators are arranged between the stator and the outer rotor. Problems of having difficulty in manufacturing axial dampers with a large damping coefficient and simulating anti-vibration dampers with a speed index of less than 1, by use of eddy current damping, can be solved simultaneously.

7 Claims, 2 Drawing Sheets

(51) Int. Cl.
*F16F 15/03* (2006.01)
*H02K 16/02* (2006.01)
*H02K 7/06* (2006.01)
*F16F 6/00* (2006.01)

(52) U.S. Cl.
CPC .............. *F16H 25/20* (2013.01); *H02K 7/06* (2013.01); *H02K 16/02* (2013.01); *H02K 49/043* (2013.01)

(58) Field of Classification Search
CPC ...... H02K 1/2706; F16F 15/035; F16F 15/03; F16F 6/00; F16F 6/0005; F16F 2222/06; F16F 2232/06
USPC ........ 310/80, 83, 105–108, 114, 156.37, 93; 74/89.23, 89; 267/140.14, 140.15; 188/161, 267, 267.1
See application file for complete search history.

(56) References Cited

U.S. PATENT DOCUMENTS

| | | | |
|---|---|---|---|
| 2008/0127757 A1* | 6/2008 | Eberlein | B29C 45/5008 74/25 |
| 2015/0015104 A1* | 1/2015 | Kataoka | H02K 7/06 310/80 |
| 2015/0076972 A1* | 3/2015 | Leiber | B60T 13/741 310/68 B |
| 2015/0345134 A1* | 12/2015 | Takahashi | F16F 9/535 52/167.2 |

FOREIGN PATENT DOCUMENTS

| | | |
|---|---|---|
| CN | 203130893 U | 8/2013 |
| CN | 103742589 A | 4/2014 |
| CN | 103821861 A | 5/2014 |
| JP | 2000320607 A * | 11/2000 |

* cited by examiner

OUTER CUP ROTARY AXIAL EDDY CURRENT DAMPER

CROSS-REFERENCE TO RELATED APPLICATIONS AND CLAIM OF PRIORITY

The present application claims priority under 35 U.S.C. § 365 to International Patent Application No. PCT/CN2014/086502, which was filed on Sep. 15, 2014, which are incorporated herein by reference into the present disclosure as if fully set forth herein.

TECHNICAL FIELD

The present invention relates to a large-size axial eddy current damper manufactured by use of screw drive.

BACKGROUND ART

Eddy current damping is generated in accordance with the basic principle in which when a conductor plate in a local magnetic field cuts magnetic lines of force, eddy current is generated in the conductor plate, and the eddy current in turn generates a new magnetic field having a direction opposite to that of the original magnetic field, and thus a damping force, which hinders a relative motion of the original magnetic field and the conductor plate, is formed therebetween, and meanwhile, under a resistance effect of the conductor plate, kinetic energy obtained by the conductor plate is converted by means of the eddy current into heat energy for dissipation. If being connected with a vibrating structure, the conductor plate may produce effects of structural damping and energy dissipation, forming an eddy current damper. Different from some damping devices commonly used in the field of structural vibration control, the eddy current damper dissipates energy without using mechanical friction, and here problems of fluid leakage and sealing do not occur since no working fluid is used; furthermore, it has advantages such as high reliability, excellent durability and relatively simple structure, and is therefore particularly suitable for use in a working environment requiring a long fatigue life and being not easy for maintenance.

An efficiency index of the damper refers to a ratio of a damping force generated by the damper at a rated speed to its own weight. The eddy current damping itself has a low energy dissipation density, and thus causes the efficiency index of the eddy current damper directly using an axial relative motion mode to be low, which is the main reason why the eddy current damping is hindered from being applied to large-scale engineering structures for a long time. The Chinese Patent Application with Publication Number of CN103821861A greatly improves the efficiency index of the eddy current damper by use of screw drive, however, it is difficult for the rotating disk structure therein to meet an anti-vibration requirement for a speed index of less than 1.

DISCLOSURE OF THE INVENTION

In view of the deficiencies in the prior art, an object of the present invention is to provide an outer cup rotary axial eddy current damper (an axial eddy current damper with a rotatable outer cup), by which the damping coefficient and mass moment of inertia of the rotary eddy current damping portion can be magnified by hundreds of times and thus be converted into an extremely large axial damping coefficient and axial equivalent added mass, thereby solving the following problems simultaneously: it is difficult to manufacture an axial damper with a large damping coefficient, and it is difficult to simulate an anti-vibration damper with a speed index of less than 1, by use of eddy current damping. Furthermore, with full use of the negative stiffness effect generated by the mass moment of inertia of rotary eddy current damping generators, the axial eddy current damper has a further improved anti-vibration control effect, and is therefore particularly applicable for controlling vibrations of a large-scale civil engineering structure having a low working frequency and requiring a large damping coefficient, with a simple and durable structure.

Technical solutions adopted in the present invention are as follows. An outer cup rotary axial eddy current damper comprises a drive assembly and one or more eddy current damping generators. The drive assembly comprises a screw drive set, and a stator and a rotor respectively made of magnetic conductive materials. The screw drive set comprises a screw rod and a nut sleeved on the screw rod. The stator is a circular tube with an upper opening and a lower opening. An upper flange is mounted at the upper opening of the stator, and a lower flange is mounted at the lower opening of the stator. The screw rod sequentially passes through a central hole of the upper flange and a central hole of the lower flange. The nut is arranged within the stator, an upper end surface of the nut is connected with a bottom surface of the upper flange via an upper bearing, and a lower end surface of the nut is connected with a top surface of the lower flange via a lower bearing. The rotor comprises an outer rotor and an inner rotor having a bottom end provided with a lower connecting flange. The lower connecting flange is fixed between the upper end surface of the nut and a lower end surface of the upper bearing. The inner rotor passes through the central hole of the upper flange, and a top end of the inner rotor is connected with the outer rotor arranged at a periphery of the stator. A gap is formed between the screw rod and the inner rotor. The one or more eddy current damping generators are provided between the stator and the outer rotor. An upper end of the screw rod protrudes from a top end of the outer rotor, and a top end of the screw rod is provided with an upper connecting end. A lower connecting tube is provided under the lower flange. A top end of the lower connecting tube is connected with the lower flange so as to make a lower end of the screw rod enclosed within the lower connecting tube, and a bottom end of the lower connecting tube is provided with a lower connecting end.

A rotary bearing is mounted between a lower end of the outer rotor and the stator.

The eddy current damping generator comprises a plurality of magnets, a circular conducting tube and a plurality of damping force adjusters. The magnets are mounted uniformly on an outer surface of the stator in a circumferential direction of the stator, and adjacent magnets have opposite polarities. The circular conducting tube is arranged within an inner wall of the outer rotor, and the circular conducting tube is connected with the outer rotor by the plurality of damping force adjusters arranged uniformly in a circumferential direction of the outer rotor. A gap is formed between the magnet and the circular conducting tube.

A magnetic conductive pad is additionally mounted between the magnet and the cylinder of the stator. A rotating gap is formed between the magnet and the circular conducting tube, and a magnetic conductive pad can be additionally mounted between the magnet and the stator when the gap is too large.

An outer surface of the circular conducting tube and the inner surface of the outer rotor are in sliding fit.

As the magnet, a permanent magnet is generally used, but an electric magnet should be used if a particularly large magnetic field strength is required or semi-active control is to be performed.

The damping force adjuster may be realized as a small bolt which passes through the outer rotor to apply a suitable pressure to the circular conducting tube in a radial direction, and may also be realized in other ways. The damping force adjuster plays a role in controlling a state in which the circular conducting tube rotates with the outer rotor, so that: when a rotational speed of the outer rotor is less than a designed maximum working speed of the present eddy current damping generator, the circular conducting tube rotates synchronously with the outer rotor; and when the speed of the outer rotor exceeds the maximum working speed of the eddy current damping generator, there is relative sliding between the circular conducting tube and the outer rotor, where the circular conducting tube keeps rotating at the designed maximum working speed so as to maintain a maximum damping force.

With different configurations of n eddy current damping generators, a damping force-speed curve consisting of n+1 broken lines may be formed, which makes it possible to simulate working characteristics of any one type of axial dampers with a speed index of less than 1; and moreover, these configurations can be adjusted directly outside the damper.

The operating principle of the present invention is explained as follows: after the upper and lower connecting ends of the damper are respectively connected to two points of a controlled structure which vibrate with respect to each other, vibrations of this structure force the screw rod to perform an axial reciprocating motion, and this motion is converted by the drive assembly into a relative rotary motion of the stator and the rotor. Since most of magnetic lines of force of the magnets fixed on the outer wall of the stator pass through the outer rotor vertically, the circular conducting tube rotating with the outer rotor cuts the magnetic lines of force to generate an eddy current effect. A damping force generated by the eddy current effect forms a large resistance torque to the rotational axis, and this torque is in turn converted by the screw set into a large damping force having a direction always opposite to the direction of the axial motion of the screw rod, in this way, the damper obtains a large damping coefficient.

Supposing that the eddy current damping coefficient at a single magnet of an m-th eddy current damping generator is $C_e$, it can be proved that, taking no account of a friction force in the screw set, an equivalent axial damping coefficient $C_m$ generated by the m-th eddy current damping generator is:

$$C_m = 4\pi^2 \left(\frac{r}{h}\right)^2 C_e,$$

where r is an inner diameter of the circular conducting tube, and h is a lead of the screw rod. Since r is much greater than h, the equivalent damping coefficient $C_m$ of the damper can be hundreds of times the damping coefficient at the single magnet. And the total equivalent damping coefficient of the damper is a sum of the damping coefficients generated by m eddy current damping generators.

In the present invention, the maximum working speeds of the individual eddy current damping generators may be set by respective damping force adjusters, respectively. After the designed maximum working speed is selected, each of the eddy current damping generators has two different working states. When the rotational speed of the outer rotor is less than the designed maximum working speed, the circular conducting tube rotates synchronously with the outer rotor, the damping force increases linearly as the rotational speed increases, and a curve of the damping force versus the rotational speed of the outer rotor is an oblique line. After the rotational speed of the outer rotor is greater than the designed maximum working speed of the eddy current damping generator, the rotational speed of the circular conducting tube is maintained constantly at the designed maximum rotational speed, and in this case, the curve of the damping force versus the rotational speed of the outer rotor is a horizontal line.

If a different maximum working speed is set for each eddy current damping generator, a curve of the total damping force obtained by summing up the damping forces generated by n eddy current damping generators versus the axial speed of the damper is a polyline consisting of n+1 segments, which can simulate the working characteristics of any damper with a speed index of less than 1, with an accuracy completely meeting the requirements of engineering.

Besides the eddy current damping force, the rotational mass moment of inertia of the rotor is converted by the screw set into a large axial added mass of the damper. Supposing that a sum of torsional mass moments of the individual parts of the rotor is $l_g$, it can be proved that, under a condition of taking no account of drive loss, the equivalent added mass $m_e$ for the axial motion of the damper is:

$$m_e = \left(\frac{2\pi}{h}\right)^2 l_g.$$

It can be seen that, when the lead h of the screw rod is very small, the torsional mass moment of the rotor can be magnified by hundreds of times and thus forms a large equivalent mass for the axial motion. The added axial mass generates an axial inertia force that hinders the axial motion of the damper, so that the damper has a large negative stiffness effect, further improving the anti-vibration control effect of the eddy current damper.

The present invention is particularly applicable for controlling vibrations of a large-scale civil engineering structure having a low working frequency and requiring a large damping coefficient; and in addition to the inherent advantages of an eddy current damper, such as a simple and durable structure and almost no requirement for maintenance, it has the following advantages compared with the technology of an existing viscous fluid damper:

1) The damper converts, by means of the screw set, an axial motion of a controlled structure into a rotary motion of the inner structure of the damper, so as to increase the efficiency index of the axial eddy current damper (a ratio of a damping force at a rated speed to its own weight) to a level which is the same as or higher than that of the viscous fluid damper.

2) The damper makes full use of the mass moments of inertia of rotational motion components in the rotary eddy current damping generators, and thus a significant negative stiffness effect can be formed, thereby further improving the anti-vibration control effect of the axial eddy current damper.

3) The damper can conveniently adjust the maximum working speeds of the individual eddy current damping generators by the damping force dampers, simulate a nonlinear damper with a speed index of less than 1 by the plurality of eddy current damping generators, and have the same damping force-speed working characteristics as the viscous fluid damper; in addition, the eddy current damper has an allowable maximum working speed much higher than that of the viscous fluid damper.

4) The damper can have its working stroke increased by increasing only the length of the screw rod, whereas the increase of the stroke requires a little cost is to be increased. In contrast, it is necessary for the viscous fluid damper to increase both the length of the piston rod and the length of the cylinder to increase the working stroke of the damper, which makes a large-stroke viscous fluid damper quite expensive.

5) The damper can have its damping coefficient increased by three ways of increasing diameters of the stator and the rotor, increasing the magnetic field strength of the magnets and increasing the number of the magnets, and it is suitable for manufacture of various dampers of a large, medium or small size.

6) The screw set drive used by the damper is a standard mechanical drive mode, thus it is easy for the present damper to make standardized mass production thereof come true.

7) Semi-active control can be realized by use of an electric magnetic, which makes the damper simpler in structure and lower in cost than a magneto-rheological damper.

DETAILED DESCRIPTION OF EMBODIMENTS

Figure 1:
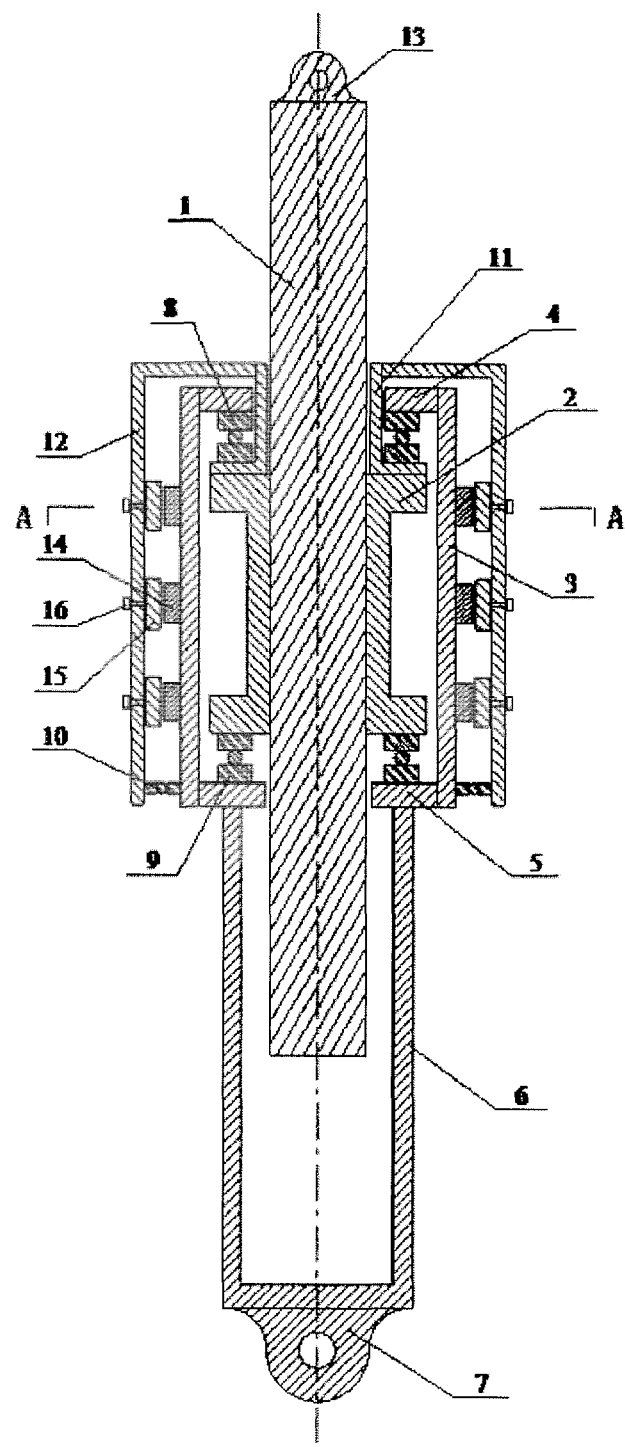
FIG. 1 is a structural schematic view of an embodiment of the present invention.

As shown in FIG. 1, an outer cup rotary axial eddy current damper includes a drive assembly and eddy current damping generators. The drive assembly includes a screw drive set, and a stator and a rotor respectively made of magnetic conductive materials. The screw drive set includes a screw rod 1 and a nut 2 sleeved on the screw rod 1. The stator 3 is a circular tube with an upper opening and a lower opening. An upper flange 4 is mounted at the upper opening of the stator 3, and a lower flange 5 is mounted at the lower opening of the stator 3. The screw rod 1 sequentially passes through a central hole of the upper flange 4 and a central hole of the lower flange 5. The nut 2 is arranged within the stator 3, with an upper end surface of the nut 2 connected with a bottom surface of the upper flange 4 via an upper thrust bearing 8, and a lower end surface of the nut 2 connected with a top surface of the lower flange 5 via a lower thrust bearing 9. The rotor includes an outer rotor 12 and an inner rotor 11 having a bottom end provided with a lower connecting flange. The lower connecting flange is fixed between the upper end surface of the nut 2 and a lower end surface of the upper bearing 8. The inner rotor 11 passes through the central hole of the upper flange 4, and a top end of the inner rotor 11 is connected with the outer rotor 12 arranged at a periphery of the stator 3. A gap is formed between the screw rod 1 and the inner rotor 11. An upper end of the screw rod 1 protrudes from a top end of the outer rotor 12, and a top end of the screw rod 1 is provided with an upper connecting end 13. A lower connecting tube 6 is provided under the lower flange 5, where a top end of the lower connecting tube 6 is connected with the lower flange 5 so as to make a lower end of the screw rod 1 enclosed within the lower connecting tube 6, and a bottom end of the lower connecting tube 6 is provided with a lower connecting end 7. A rotary bearing 10 is mounted between a lower end of the outer rotor 12 and the stator 3.

The inner rotor 11 transmits a rotary motion of the nut 2 to the outside of the stator, to drive the outer rotor 12 to rotate together therewith. Once there is a relative motion between the upper and lower connecting ends of the damper, the outer rotor would rotate.

Figure 2:
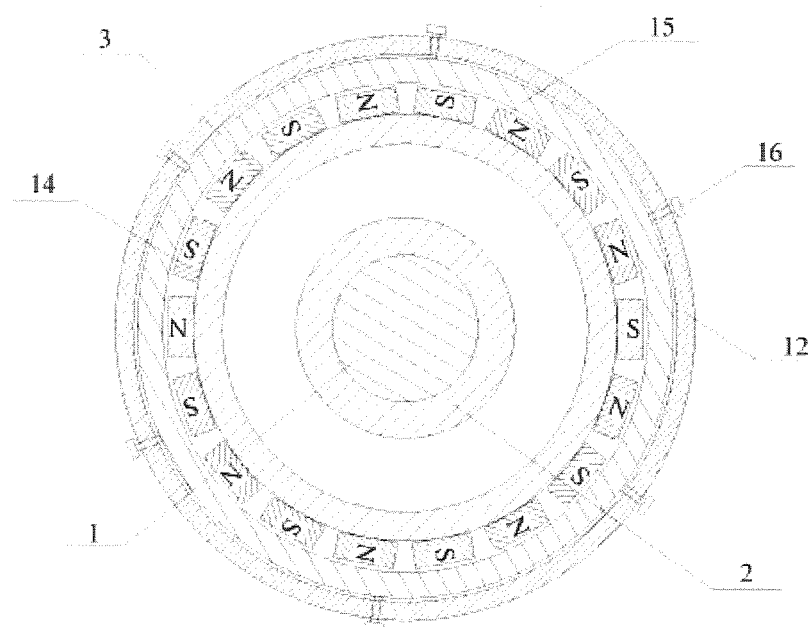
FIG. 2 is a sectional view of A-A face in FIG. 1.

Three eddy current damping generators are provided from top to bottom. Each eddy current damping generator includes 18 permanent magnets 14, a circular conducting tube 15, and 6 damping force adjusters 16. The permanent magnets 14 are mounted uniformly on an outer surface of the stator 3 in a circumferential direction of the stator 3, and as shown in FIG. 2, adjacent magnets 14 have opposite polarities. The circular conducting tube 15 is arranged within an inner wall of the outer rotor 12, and the circular conducting tube 15 is connected with the outer rotor 12 by the 6 damping force adjusters 16 arranged uniformly in a circumferential direction of the outer rotor. A gap of 3 mm is formed between the permanent magnet 14 and the circular conducting tube 15. An outer surface of the circular conducting tube 15 and the inner surface of the outer rotor 12 are in sliding fit.

The damping force adjusters are mounted in a uniform distribution manner along the circumferential direction of the outer rotor 12, and play a role in controlling a state in which the circular conducting tube 15 rotates with the outer rotor 12, so that: when a rotational speed of the outer rotor is less than a designed maximum working speed of the present eddy current damping generator, the circular conducting tube 15 rotates synchronously with the outer rotor 12; and when the speed of the outer rotor exceeds the maximum working speed of the eddy current damping generator, there is relative sliding between the circular conducting tube 15 and the outer rotor 12, where the circular conducting tube keeps rotating at the designed maximum working speed so as to maintain a maximum damping force.

Set values for the maximum damping forces of the individual eddy current damping generators may be different, which makes it possible to form a damping force-speed curve consisting of 4 broken lines, and simulate working characteristics of any one type of axial dampers with a speed index of less than 1; and moreover, they can be adjusted directly outside the damper.

The adjustment of the damping force is achieved in such a manner that: the damping force adjuster 16 adopts a small bolt, which passes through the outer rotor to apply a suitable positive pressure to the circular conducting tube in a radial direction.

The electrically conductive material is electrical red copper, and the magnetic conductive material is electrical soft iron.

The invention claimed is:

1. An outer cup rotary axial eddy current damper, comprising:
    a drive assembly comprising:
        a screw drive set, wherein the screw drive set comprises a screw rod and a nut sleeved on the screw rod;
        a stator made of magnetic conduct materials, wherein the stator is a circular tube with an upper opening and a lower opening, an upper flange is mounted at the upper opening of the stator, and a lower flange is mounted at the lower opening of the stator, the screw rod sequentially passes through a central hole of the upper flange and a central hole of the lower flange, and the nut is arranged within the stator, an upper end surface of the nut is connected with a bottom surface of the upper flange via an upper bearing, and a lower end surface of the nut is connected with a top surface of the lower flange via a lower bearing; and a rotor made of magnetic conduct materials, wherein the rotor comprises an outer rotor and an inner rotor having a bottom end provided with a lower connecting flange, the lower connecting flange is fixed between the upper end surface of the nut and a lower end surface of the upper bearing, the inner rotor passes through the central hole of the upper flange and a top end of the inner rotor is connected with the outer rotor arranged at a periphery of the stator, and a gap is formed between the screw rod and the inner rotor; and one or more eddy current damping generators between the stator and the outer rotor, wherein an upper end of the screw rod protrudes from a top end of the outer rotor and a top end of the screw rod includes an upper connecting end, a lower connecting tube is provided under the lower flange, a top end of the lower connecting tube is connected with the lower flange such that a lower end of the screw rod is enclosed within the lower connecting tube, and a bottom end of the lower connecting tube includes a lower connecting end.

2. The outer cup rotary axial eddy current damper according to claim 1, wherein a rotary bearing is mounted between a lower end of the outer rotor and the stator.

3. The outer cup rotary axial eddy current damper according to claim 1, wherein the one or more eddy current damping generators comprises a plurality of magnets, a circular conducting tube and a plurality of damping force adjusters, the plurality of magnets are mounted uniformly on an outer surface of the stator in a circumferential direction of the stator, adjacent magnets of the plurality of magnets have opposite polarities; and wherein the circular conducting tube is arranged within an inner wall of the outer rotor, and the circular conducting tube is connected with the outer rotor by the plurality of damping force adjusters arranged uniformly in a circumferential direction of the outer rotor and a gap is formed between the plurality magnets and the circular conducting tube.

4. The outer cup rotary axial eddy current damper according to claim 3, wherein a magnetic conductive pad is additionally mounted between each of the plurality of magnets and the stator.

5. The outer cup rotary axial eddy current damper according to claim 3, wherein an outer surface of the circular conducting tube and an inner surface of the outer rotor are in sliding fit.

6. The outer cup rotary axial eddy current damper according to claim 3, wherein the damping force adjuster is a bolt.

7. The outer cup rotary axial eddy current damper according to claim 1, wherein each of the plurality of magnets is a permanent magnet or electric magnet.

* * * * *